United States Patent [19]

McElhannon

[11] Patent Number: 4,478,361

[45] Date of Patent: Oct. 23, 1984

[54] AUTOMATIC NAILING APPARATUS

[76] Inventor: Gordon W. McElhannon, P.O. Box 309, Foreman, Ark. 71836

[21] Appl. No.: 357,052

[22] Filed: Mar. 11, 1982

[51] Int. Cl.[3] .......................... B27F 7/02; B23P 19/00

[52] U.S. Cl. .......................................... 227/7; 227/45; 227/48

[58] Field of Search ................... 227/7, 48, 51, 41, 45, 227/47

[56] References Cited

U.S. PATENT DOCUMENTS

| | | | |
|---|---|---|---|
| 3,681,842 | 8/1973 | Blakeslee | 227/7 X |
| 3,763,547 | 10/1973 | Blakeslee | 227/48 X |
| 3,873,015 | 3/1975 | Whitaker | 227/7 |
| 3,945,549 | 3/1976 | Colson | 227/45 |

FOREIGN PATENT DOCUMENTS

| | | | |
|---|---|---|---|
| 797326 | 4/1936 | France | 227/45 |

*Primary Examiner*—Paul A. Bell

*Attorney, Agent, or Firm*—Arnold, White & Durkee

[57] ABSTRACT

Apparatus for pallet fabricating operates to automatically nail together an arrangement of transversely extending slats and longitudinally extending stringers, which is continuously advancing. The automatic nailing utilizes nailing control in which a slat position sensor determines that a slat and underlying stringers are in position beneath a plurality of nail guns for nailing. The arrangement of slats and stringers are continuously moved by a conveyor as the nailing takes place. The slats and stringers are positioned on the conveyor automatically by controlled ejection of the same from slat and stringer magazines.

11 Claims, 15 Drawing Figures

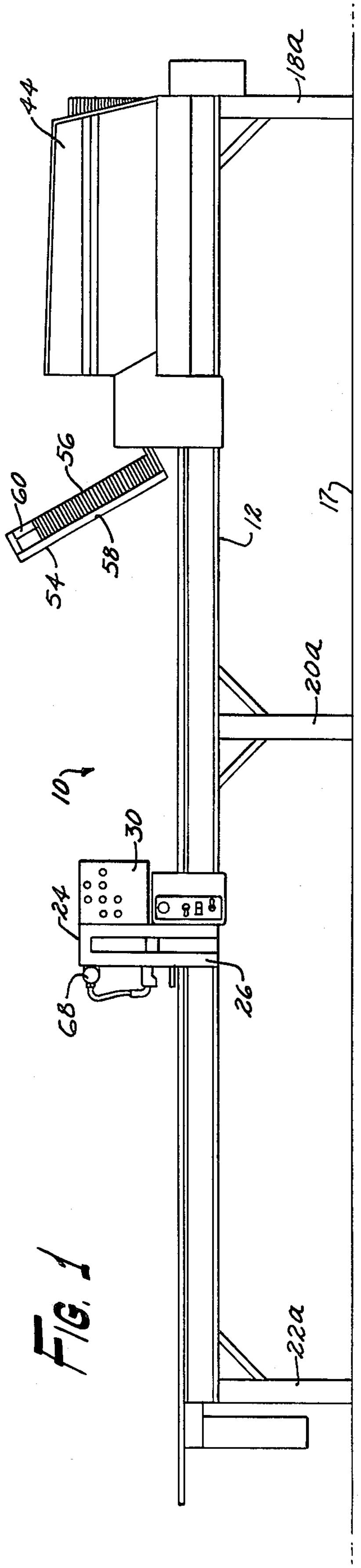
FIG. 1
FIG. 4
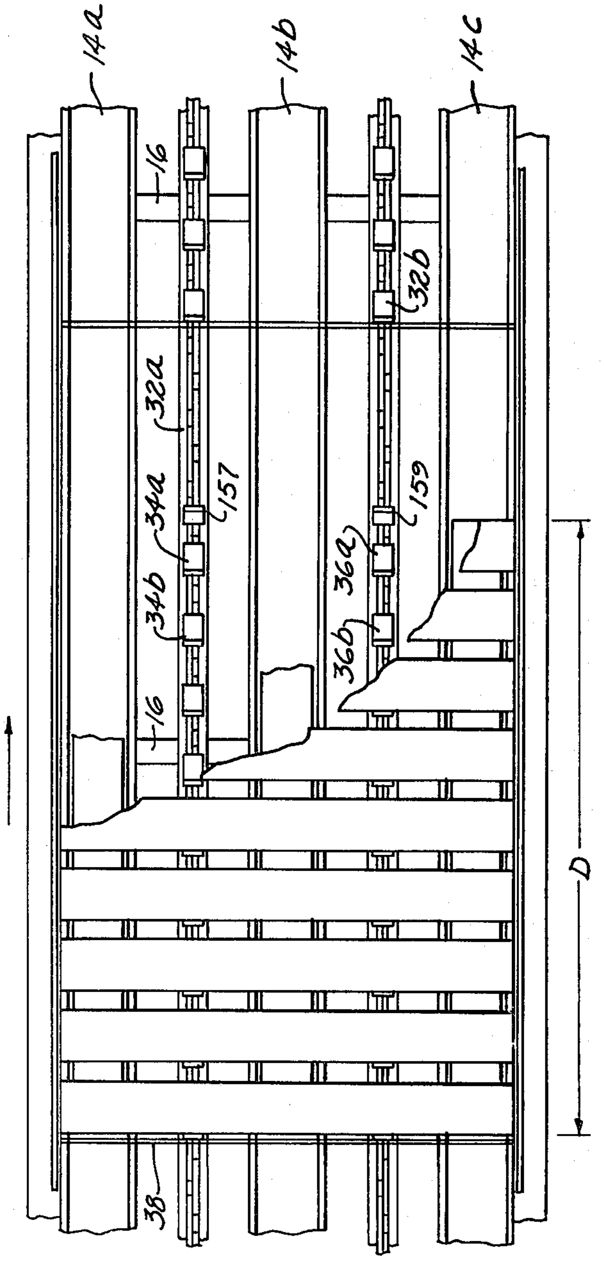

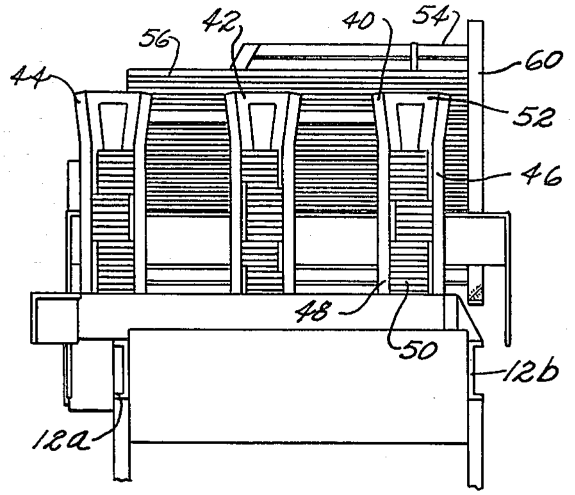
FIG. 2
FIG. 3
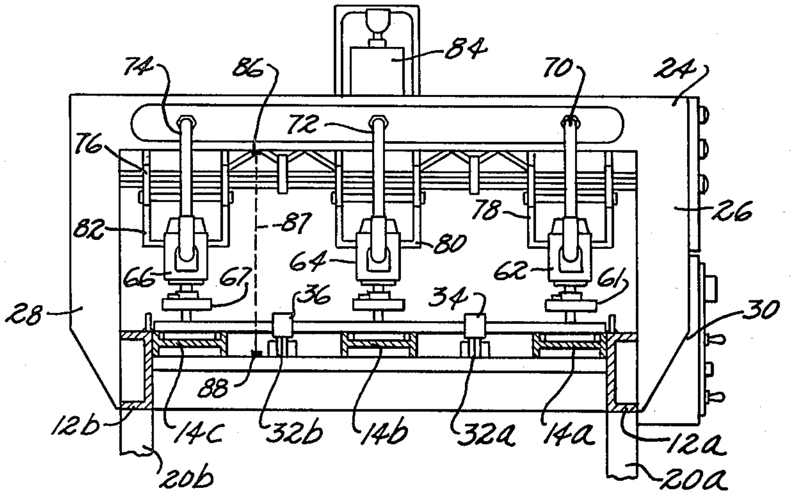
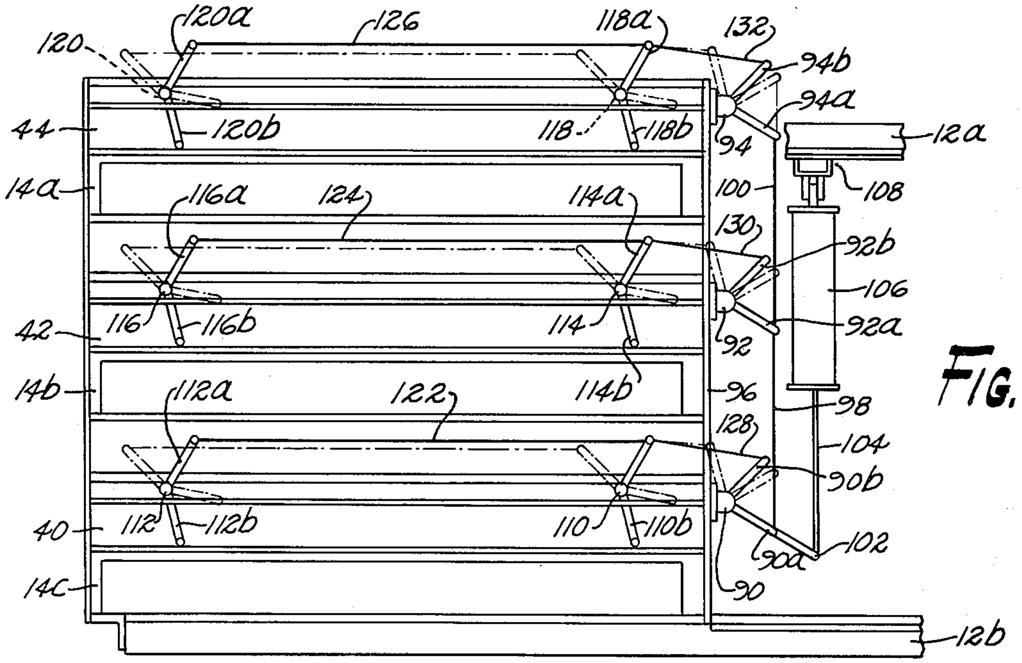
FIG. 5

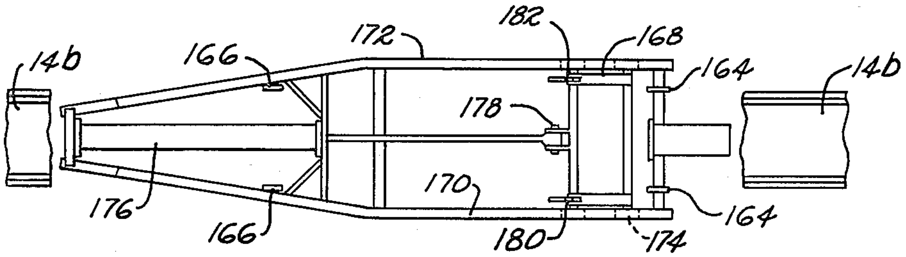
FIG. 7C
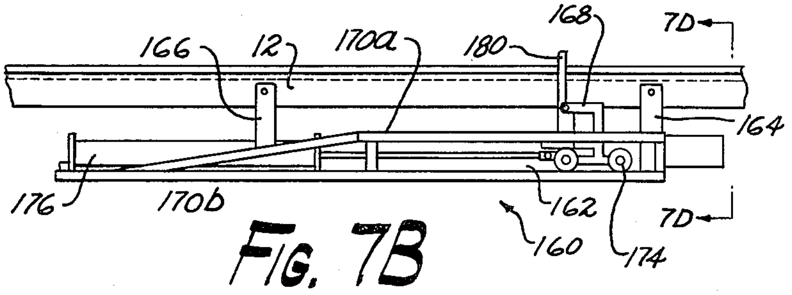
FIG. 7B
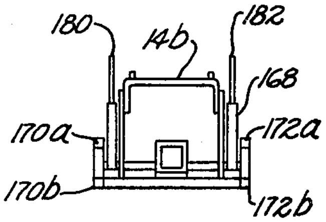
FIG. 7D
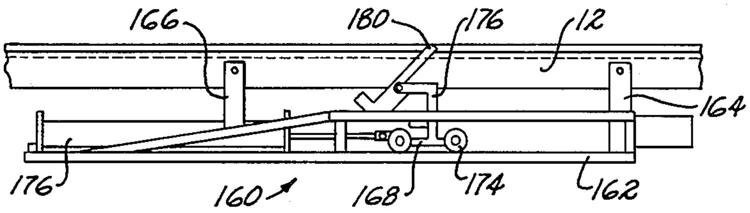
FIG. 7A
FIG. 6A
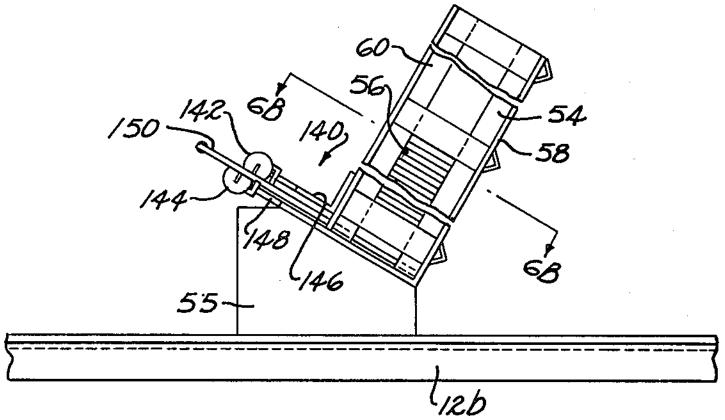
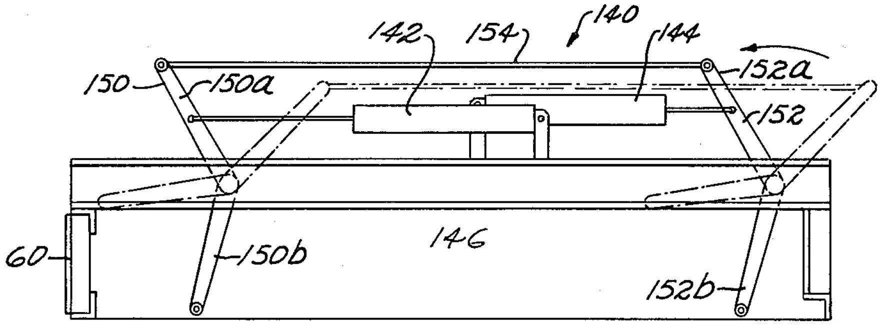
FIG. 6B

AUTOMATIC NAILING APPARATUS

BACKGROUND OF THE INVENTION

The present invention relates generally to pallet fabricating systems; and more particularly, it relates to automatic nailing apparatus for forming and nailing together an arrangement of transverse slats and longitudinal stringers.

In the past, pallet fabricating has been conducted in various ways involving the nailing of a plurality of transverse board slats to a plurality of parallel, spaced-apart board stringers. Principally, the procedure followed in pallet fabricating has been to manually position the slats and stringers in the desired arrangement using a jib, whereupon the pieces are nailed together manually using hand-held nailing guns.

Automatic nailing apparatus is also known in the art (see, for example, U.S. Pat. No. 3,945,549) for pallet fabricating. However, this apparatus operates in a stitch nailing fashion which curtails severely the throughput attainable by automatic forming and nailing.

SUMMARY OF THE INVENTION

The automatic nailing apparatus of the present invention operates to nail a transversely-extending slat to a plurality of stringers as the slat and stringers are being continuously advanced. The operation of the automatic nailing apparatus of the present invention is in distinct contrast to automatic nailing apparatus which operate in a switch nailing fashion.

The automatic nailing apparatus of the present invention further provides for repetitively nailing each of a plurality of transversely-extending slats to a plurality of longitudinal stringers, as the slats and stringers are being continuously advanced.

In order to provide such operation of an automatic nailing apparatus, and in accordance with the present invention, nailing control means is utilized which senses the positioning of an advancing slat and underlying stringers beneath a nailing means, and actuates the nailing means without interruption of the advancement of the slat and stringers to produce nailing of the slat to the stringers.

Further in accordance with the present invention, slat position sensing by means of a source of radiant energy and a radiant energy responsive element disposed opposite one another and in proximity to the nailing means. The radiant energy source establishes a beam of radiant energy directed across the pathway of an advancing slat, and impinging upon the radiant energy responsive element, so as to be interrupted by an advancing slat. Additional means is coupled to the radiant energy responsive element for causing the nailing means to operate when a slat advances into position interrupting the radiant energy beam impinging upon the radiant energy responsive element.

Suitably, and yet further in accordance with the present invention, the nailing means may be a conventional pneumatic nail gun. In a preferred embodiment of the invention, a separate nail gun is provided to nail each intersection a slat makes with a plurality of stringers. For example, if there are three stringers to be nailed, three nail guns would be utilized.

Also, in accordance with the present invention, the nailing means is suitably one which is triggered for nailing upon contact with a slat. In a preferred embodiment, therefore, the nailing means suitably further comprises means for mounting the nail guns for vertical movement and means for causing the nail guns to be lowered from a raised position into contact with an advancing slat.

To facilitate the fabrication of pallets or like structures having transverse slats and longitudinal stringers, apparatus in accordance with the present invention may further comprise a plurality of stringer magazines, each holding a vertical stack of stringers, and a slat magazine holding a stack of slats. Stringers and slats are ejected from the magazines onto a moving conveyor for guided advancement to the nailing means.

In a preferred embodiment of the nailing apparatus an elongated frame is utilized having parallel, longitudinally-extending guide means for directing stringers along spaced-apart parallel paths. A transversely-extending member is mounted to the frame in an elevated position above the guide means. The nailing means is mounted on this transverse member. The stringer and slat magazines are carried in the aft portion of the frame, with slat and stringer ejecting means being provided. An endless chain conveyor carried on the frame is suitably utilized for advancing the slats and underlying stringers to the nailing means. Control means is further included for sequencing the operation of the various portions of the apparatus.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein:

FIG. 1 is an overall side view of one embodiment of automatic nailing apparatus in accordance with the present invention;

FIG. 2 is a view of the embodiment in FIG. 1 from the rear of the apparatus, showing the stringer magazines;

FIG. 3 is a view of the embodiment in FIG. 1 from the front of the apparatus, showing the nailing means used therein;

FIG. 4 is a plan view of a partial section of the embodiment in FIG. 1, showing the stringer guide means and conveyor used therein;

FIG. 5 is a plan view of the stringer magazine board ejecting means used in the embodiment shown in FIG. 1;

FIGS. 6A and 6B are side and plan section views, respectively, showing the slat magazine and slat magazine board ejecting means used in the embodiment shown in FIG. 1;

FIGS. 7A, 7B, 7C and 7D are side, plan, and end views of a board pusher mechanism used in the embodiment of FIG. 1;

DETAILED DESCRIPTION OF THE PREFERRED EMBODIMENTS

Figure 8:
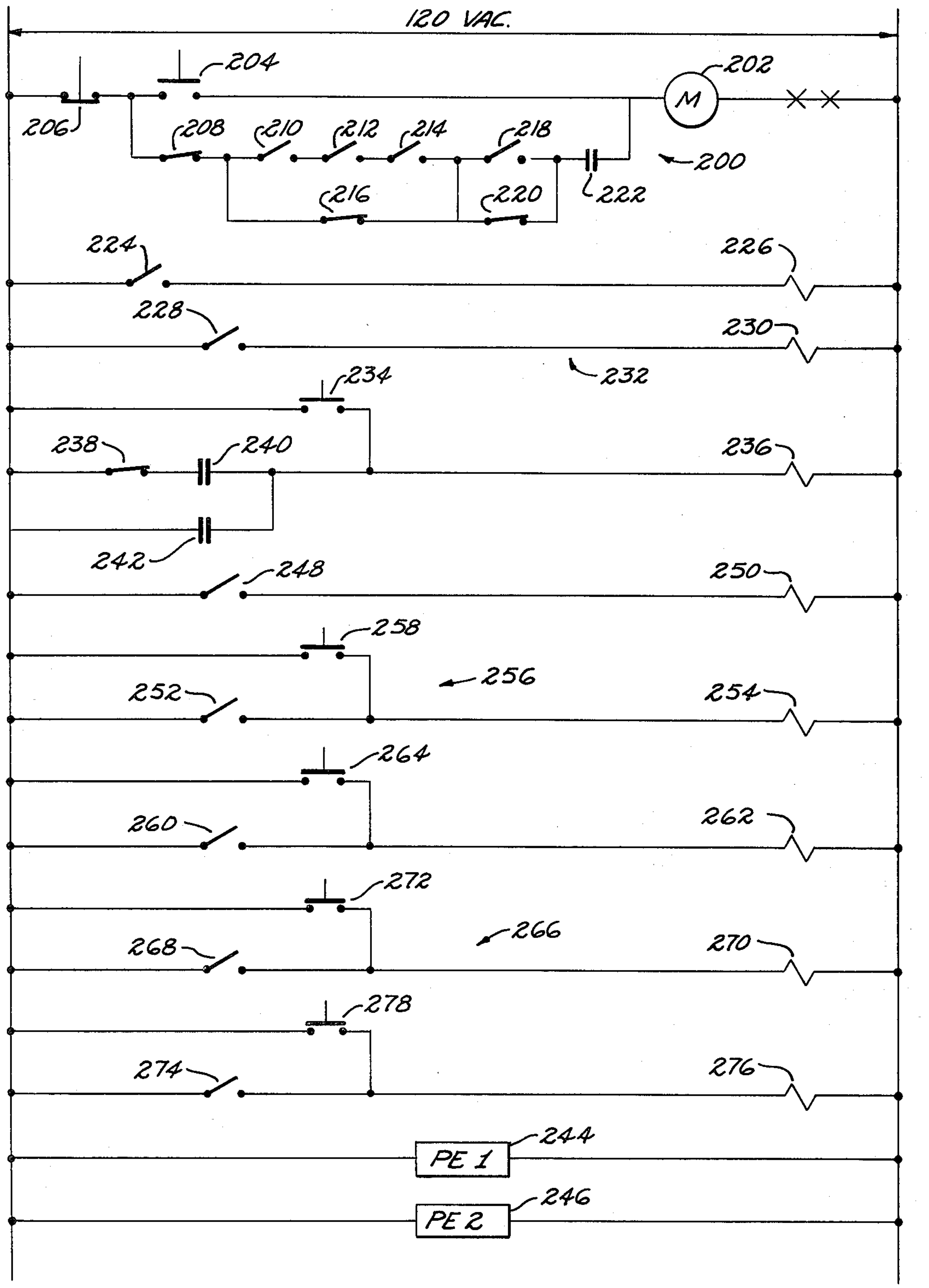
FIG. 8 is a schematic diagram of the electrical controls for sequencing the operation of the various functional components of the embodiment of FIG. 1.

Referring to the drawing figures, there is shown therein preferred embodiments of automatic nailing apparatus instructed in accordance with the present invention. One embodiment is shown in the drawings of FIGS. 1–8, and a second embodiment is shown in FIGS. 9A–C. The construction of the two embodiments is essentially identical except that the embodiment of FIG. 9 is adjustable to accomodate varying dimensions of the board slats to be nailed.

Referring first to FIGS. 1, 2, 3 and 4, there is shown an automatic nailing apparatus 10 for nailing transverse board slats to parallel spaced-apart board stringers. The embodiment shown is, for example, suitable for forming the platform surface portion of a pallet. Apparatus 10 includes an elongated frame 12 having parallel, longitudinally-extending guide means 14 for directing stringers along spaced-apart parallel paths.

In a preferred embodiment, guide means 14 may suitably be U-shaped channels sized to accomodate the width of the board stringers. In the embodiments described herein, the apparatus is adapted for nailing transverse board slats to three-spaced parallel board stringers. Accordingly, guide means 14 includes three separate channels 14A, 14B and 14C.

Frame 12 includes a pair of parallel spaced-apart elongate frame rail members 12A and 12B and a plurality of cross member supports 16 interconnecting the frame rail members at spaced intervals longitudinally therealong to maintain the spaced, parallel relationship of the frame rails. There is further provided a plurality of pairs of vertical support legs 18, 20 and 22 for supporting frame 12 above floor 17.

A member 24 extends transversely to frame 12 and is mounted thereto by vertical supports 26 and 28. Mounted to transverse member 24 is nailing means to be described. Also, vertical support member 26 has mounted thereon controls housing 30 for portions of the various control means utilized in the apparatus.

An endless chain conveyor 32 comprising a pair of endless conveyor chains 32A and 32B are longitudinally disposed between the pair of elongate frame rail members 12A and 12B. Also, as shown in FIG. 4, chain 32A is directed between guide channels 14A and 14B, and chain 32B is directed between guide channels 14B and 14C. The conveyor chains engage conventional sprockets and electric motor drive elements (not shown) so as to be simultaneously driven. Each endless conveyor chain carries a plurality of L-shaped lugs for engaging a plurality of transverse board slats. As shown in FIG. 4, chain 32A carries a plurality of lugs 34 and chain 32B carries a plurality of lugs 36. Lugs 34 and 36 are positioned on their respective conveyor chains to be directly across from one another, and therefore arranged in pairs. Also, the spacing between adjacent lugs on the same conveyor chain is preselected for the desired spacing between adjacent board slats.

As best shown in FIG. 4, the embodiment under discussion is adapted for constructing a pallet having three longitudinal stringers and nine transverse slats. Accordingly, lugs 34 and 36 on the conveyor chains are arranged in groups of nine lug pairs. It should be appreciated that there will be several groups of lug pairs distributed along the endless conveyor. Also, extending transversely of conveyor chains 32A, 32B and connected to each for movement therewith are a number of pusher bars 38. Each pusher bar is provided to engage the aft end of each longitudinal stringer and urge it along in its respective guide channel.

Apparatus 10 further includes a stringer magazine mounted on the frame adjacent each of the guide channels, for holding in a vertical stack a plurality of the board stringers. In the preferred embodiment, three stringer magazines 40, 42, and 44 are utilized. As shown in FIG. 1 the stringer magazines are located on frame 12 at the end of the frame rail members. As shown in FIGS. 1 and 2, each stringer magazine comprises vertical side walls and a front end stop. For example, referring to stringer magazine 40, vertical walls 46, 48 are indicated which defines a slot opening for the vertical stack 50 of board stringers. The end stop 52 extending between the vertical walls establishes the longitudinal placement of the stringers of the stack within the slot opening. A similar construction is provided for each of stringer magazines 42 and 44.

Apparatus 10 further includes a slat magazine 54 mounted on frame 12 ahead of the stringer magazines, for holding in a vertical stack 56 a plurality of board slats. The slat magazine includes a bottom support structure 58 for supporting the vertical stack of boards from underneath. Moreover, in the embodiment shown herein, the support member 58 is disposed in an inclined orientation such that the boards in the stack are supported on their edges as well. To establish uniform longitudinal positioning of the boards in the stack, an end stop member 60 is affixed to one side of support member 58.

In the operation of apparatus 10, the lowermost board stringer in each stringer magazine is ejected from the stack into a respective one of the guide channels 14. As the three board stringers are advanced longitudinally beneath slat magazine 54, the lowermost board slat in stack 56 is ejected therefrom and into position overlying the board stringers. As should be appreciated, for each grouping of three board stringers, nine board slats are ejected into position thereon. The arrangement of stringers and slats then continues its advancement to the nailing means mounted on transverse member 24.

The nailing means mounted on transverse member 24, for automatically nailing the transversely-extending slats to the longitudinal stringers, in the embodiment shown herein, suitably comprises conventional pneumatic nail guns 62, 64 and 66. Compressed air for operation of the nail guns is supplied from manifold 68 through individual gun air supply lines 70, 72 and 74. The nail guns are triggered for nailing upon contact with a member to be nailed. Accordingly, in addition to the nail guns themselves, the nailing means utilized in the apparatus may be considered as further including a means for mounting the nail guns for vertical movement and a means for causing the nail guns to be lowered from a raised position into contact with an advancing slat.

In the embodiment being described herein, the mounting means may suitably be a mechanical linkage 76 mounted to transverse member 24 and its vertical supports 26, 28. Nail guns 62, 64 and 66 are individually secured by brackets 78, 80 and 82, respectively, to linkage 76. The means for causing the nailing guns to move vertically is preferably a fluid-operated cylinder and ram mechanism 84 connected between transverse member 24 and linkage 76. Upon selective actuation of mechanism 84, linkage 76 can be made to move vertically, thereby causing the nailing guns to move vertically between a raised position and a lowered position.

Apparatus 10 further includes means for nailing control. Nailing control in accordance with the present invention involves sensing that a transverse slat is in the position beneath the nailing means and actuating the nailing means to drive a nail through the slat into each of the underlying stringers as the same are continuously moved by the conveyor. The nailing control means includes a source of radiant energy 86 positioned proximate the nailing means for establishing a beam 87 of radiant energy directed across the pathway of advancing slats so as to be interrupted by each one. A radiant energy beam responsive element 88 is positioned opposite the radiant energy source 86 and disposed in substantial alignment therewith so as to be impinged by the radiant energy beam 87. Additional means to be described is coupled to the radiant energy responsive element for causing the nailing means to be actuated.

In operation, as the board stringers and transverse board slats continuously move under the nail guns, the leading edge of each transverse slat interrupts the radiant energy beam causing the nailing means to be actuated and resulting in nails being driven through the slat and into each stringer.

Referring now to FIG. 5, there is shown means for ejecting from each stringer magazine the lower most one of the vertical stack of stringers therein, so as to place a stringer in each of the guide channels 14. The stringer ejecting mean includes first, second and third primary pivot arm mechanisms 90, 92 and 94, which are mounted to a transverse vertical plate 96. Each of the pivot arm mechanisms is a bell crank type having first and second arms. For example, mechanism 90 has arms 90A and 90B. The primary pivot arm mechanisms are innerconnected for simultaneous movement by connecting rods 98 and 100. As shown, rod 98 extends between arms 90A and 92A, and rod 100 extends between arms 92A and 94A. Arm 90A on primary pivot arm mechanism 90 also includes at the end thereof a pivot mechanism 102 adapted for connection to the ram 104 of an air cylinder and ram mechanism 106. The air cylinder portion of mechanism 106 is connected to frame rail 12A by connection mechanism 108. Upon extending and retracting ram 104, the primary pivot arm mechanisms 90, 92 and 94 can be made to pivot between first and second pivot positions.

The stringer ejecting means utilized in the preferred embodiment being described further includes pairs of secondary pivot arm mechanisms for each stringer magazine. For example, secondary pivot arm mechanisms 110, 112 are provided for stringer magazine 40. Secondary pivot arm mechanisms 114, 116 are provided for stringer magazine 42; and secondary pivot arm mechanisms 118, 120 are provided for stringer magazine 44. Each of the secondary pivot arm mechanisms includes a control arm and a cam member. For example, on pivot arm mechanism 110, the control arm is designated 110A and the cam member is designated 110B. A similar means of designation is adopted for each of the other secondary pivot arm mechanisms as indicated in the drawing figure.

The control arms of each one of the pairs of secondary pivot arm mechanisms are innerconnected. For example, control arms 110A and 112A are innerconnected by rod 122. Similarly, control arms 114A and 116A are innerconnected by rod 124; and control arms 118A, 120A are innerconnected by rod 126. The innerconnected pairs of secondary pivot arm mechanisms are inturn innerconnected with one of the primary pivot arm mechanisms 90, 92 and 94. As shown, pivot arm mechanisms 110, 112 are innerconnected with pivot arm mechanism 90 by rod 128. Similarly, pivot arm mechanisms 114, 116 are innerconnected with pivot arm mechanism 92 by rod 130. Finally, pivot arm mechanisms 118, 120 are connected with pivot arm mechanism 94 by rod 132.

Accordingly, upon movement of each primary pivot arm mechanism, there is simultaneous movement of the secondary pivot arm mechanisms as well. Moreover, the movement of the secondary pivot arm mechanisms is between first and second pivot positions of the cam member of each.

The pairs of secondary pivot arm mechanisms are mounted adjacent each stringer magazine such that the cam member on each is positioned to engage the side edge of the lowermost one of the vertical stack of board stringers in the respective stringer magazine. Engagement of the lowermost board stringer in each magazine by the respective cam members occurs upon extension of the ram 104 from its retracted position within cylinder 106. Continued extension of ram 104 results in the cam members pushing the lowermost board in each stringer magazine stack out of its respective stack and into the adjacent guide channel. Retraction of ram 104 results in movement of the various pivot arm mechanisms into the position shown in dotted outline. Movement of the cam members into the positions shown in dotted outline, of course, results in each vertical stack of stringers being dropped down so as to establish a new lowermost stringer. The cylinder and ram mechanism is operated by control means to be described.

Referring to FIGS. 6A–6B, there are shown side and section views, respectively, of slat ejecting means for ejecting the lowermost one of the vertical stack of board slats in slat magazine 54, to place a transversely-extending slat onto stringers placed in the guide channels of the frame. In FIG. 6A, slat magazine 54 is shown in somewhat greater detail, particularly as to its mounting bracket 55 which attaches the mechanism to frame 12. The slat ejecting means 140 include first and second fluid-operated cylinder and ram mechanisms 142, 144. These mechanisms are shown to the mounted to slat magazine 54 by support brackets 146, 148.

Referring now to FIG. 6B, the slat ejecting mechanism 140 is shown from a top view. In this view, the slat ejecting means can be seen to further include first and second pivot arm mechanisms 150, 152. These mechanisms are mounted between brackets 146, 148. Both mechanisms 150, 152 have a control arm and a cam member. The control arms are designated 150A and 152A; and the cam members are designated 150B and 152B. The control arms 150A and 152A are innerconnected by a rod 154. In addition, the ram of cylinder and ram mechanisms 142 connects to control arm 150A; and similarly, the ram of cylinder and ram mechanism 144 connects to control arm 152A. As will be appreciated, pivot arm mechanisms 150, 152 move between first and second pivot positions. As will be further appreciated, the cam members 150B, 152B serve upon rotation into the position shown to engage the lowermost board slat in a stack of slats in magazine 54, and eject it therefrom onto a group of underlying stringers. By means of controlled actuation of cylinder and ram mechanisms 144, 146, pivot arm mechanisms 150, 152 can be moved between the position shown by the solid lines and the position indicated by the dotted outline. In operation of the slat ejecting mechanism, cylinder and ram mechanism 146 is utilized to rotate the cam members into the position shown; and cylinder and ram mechanism 144 is utilized to retract the cam members into the position shown in dotted outline.

Referring now to FIGS. 7A–7D, there is shown a board pusher mechanism which may be incorporated into the automatic nailing apparatus shown in the preceeding drawing figures. The board pusher mechanism has utility and is desirable in situations where the overall front to back length dimension of the nailed together slats and stringers structure is of critical importance. Referring briefly to FIG. 4, it will be understood that each transverse slat is pushed along from behind by lugs 34, 36. Because the front to back width dimension of slats typically vary, the overall length dimension D of the nailed structure will, of course, vary. Therefore, in order to assure a uniform dimension D for each nailed together structure, the lead transverse slat must be registered from its front edge rather than its back edge. This is accomplished by providing front registration lugs 157, 159 on conveyor chains 32A, 32B, and utilizing the board pusher mechanism shown in FIG. 7 to urge the leading slat against the registration lugs just prior to nailing.

Referring to first to FIGS. 7A and 7B, the board pusher mechanism 160 is shown in side views. In the view of FIG. 7A, the board pusher mechanism is shown in its retracted position which allows an arrangement of slats and stringers to pass overhead. In FIG. 7B, the board pusher mechanism is shown in its extended position for pushing the lead transverse slat forward into position against the registration lugs on the conveyor chains. The board pusher mechanism 160 is suspended beneath frame 12. Specifically, the board pusher mechanism is disposed beneath the center guide channel **14*b***.

The board pusher mechanism comprises a frame track 163 which is supported from frame 12 by front and rear pairs of support brackets 164, 166. The structural arrangement of frame 163 and the location of support bracket 164, 166 are further illustrated in the top view of FIG. 7C. Frame 163 defines a guide track for a movable car 168. More particularly, frame 163 has side rails 170 and 172, each of which comprises an upper side rail member and a lower side rail member. The upper and lower side rail members are designated **170*a*, 170*b* and 172*a*, 172*b*. The movable car 168 has rollers 174 which roll along the upper surface of the side rail members 170*b* and 172*b*. As will be appreciated, car 168 is guided along in its forward and aft movement by side frame members 170, 172**.

For moving car 168, a fluid-operated cylinder and ram mechanism 176 is provided. The cylinder portion of mechanism 176 is secured within frame 162 of the board pusher mechanism as best shown in FIG. 7C. Through extension and retraction of the ram of mechanism 176, car 168 is moved between the rearward position shown in FIG. 7A and the forward position shown in FIG. 7B.

Car 168 has a frame 176 to which rollers 174 attach. Frame 176 further includes a pin connection 178 by which the ram of cylinder and ram mechanism 176 attaches. Pivoting arms 180, 182 are also attached to frame 176. The pivoting arms permit passage thereover of board slats. However, when car 168 is advanced forward by mechanism 176 such that the pivoting arms 180, 182 engage the back edge of a transverse slat, the pivoting arms lock in an upright position.

In operation, when the lead transverse slat of a slat and stringer structure to be nailed together is advanced to a designated position, mechanism 176 is actuated by control means to be described to advance car 168, thereby causing the pivoting arms to engage the slat and push it forward against the registration lugs. By such operation, the overall length dimension of the nailed together slat and stringer structure is assured to be a specified dimension.

Figure 9A:
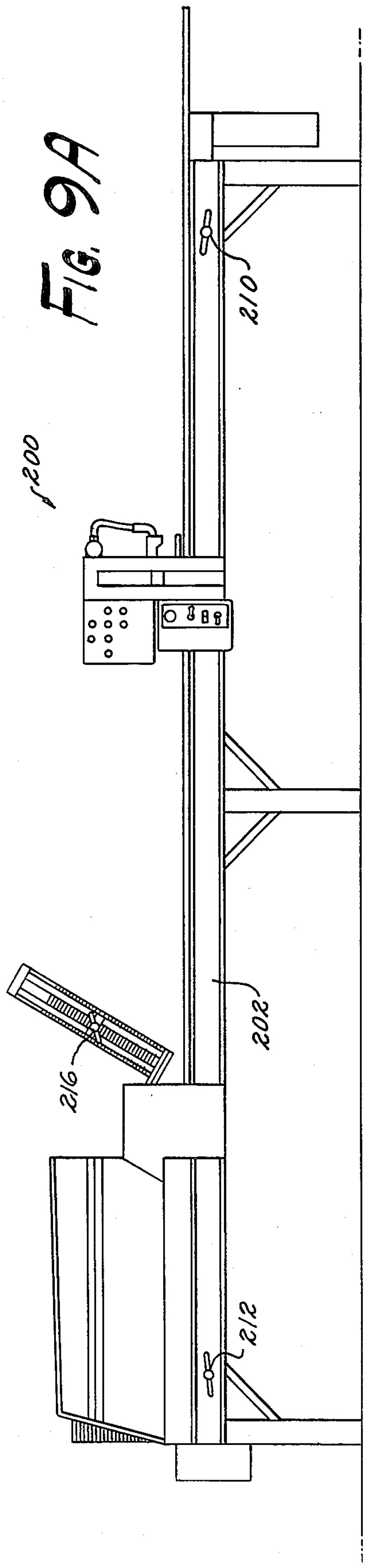
FIGS. 9A, 9B and 9C are side, end, and plan views, respectively, of a second embodiment of automatic nailing apparatus in accordance with the present invention in which the width of the apparatus is adjustable to accommodate various length slats to be nailed.
Figure 9C:
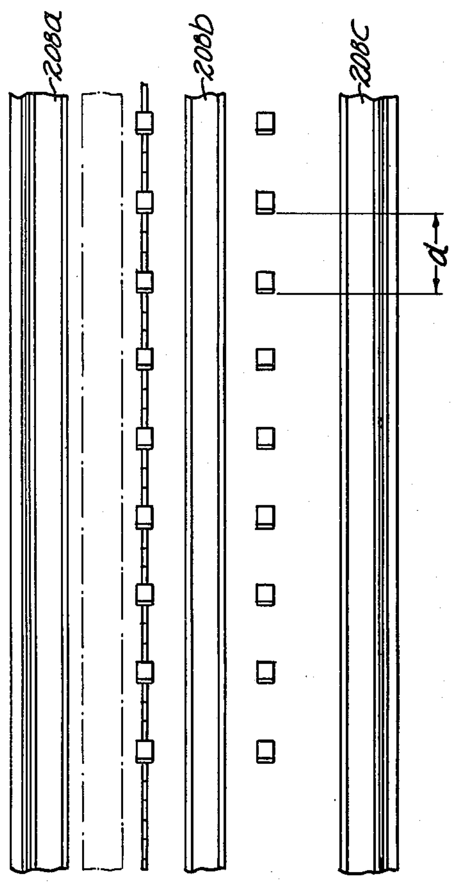
Figure 9B:
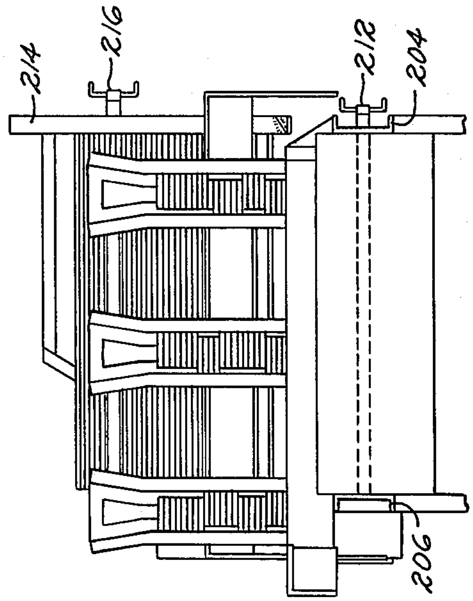

Referring now to FIG. 8, there is shown a schematic diagram of electrical control circuitry for implementing the various control means required to sequence the operation of the various portions of the automatic nailing apparatus shown in FIGS. 1–7 and heretofore described. As indicated, the control circuitry is suitably powered from a source of 120 volts AC electrical power.

The first control means, which generally designated by the reference numeral 200, is for the conveyor main drive and includes motor 202, manual push button start switch 204, and manual push button stop switch 206. In addition, control means 200 includes a number of fail-safe limit switches. These switches include normally closed limit switch 208, which provides a safety switch on the motor clutch. Should the conveyor have an abnormal load placed on it, the clutch disengages and switch 208 opens, thereby stopping motor 202. Normally open limit switches 210, 212 and 214 provide a check to assure that three board stringers have been ejected from the stringer magazines into the guide channels. If all three guide channels have a stringer position therein, switches 210, 212 and 214 are closed and operation of motor 202 will continue upon opening of limit switch 216. Limit switch 216 is opened by advancement of the conveyor after the slat ejectors have been actuated. Normally open limit switch 218 is provided to detect proper operation of slat ejecting means. When a transverse slat is ejected from the slat magazine, limit switch 218 is closed; and thus, when limit switch 220 is opened, motor 202 can continue to run. Main drive control means 200 also includes a seal-in contact 222.

Limit switch 224 is actuated when the conveyor has moved the lead transverse slat into a position to be engaged by the board pusher. Upon closure of switch 224, solenoid 226 is energized which results in actuation of cylinder and ram mechanism 176. Limit switch 228 detects that the lead slat has been pushed into the appropriate position by the board pusher. Upon closure of switch 228, solenoid 230 is energized to retract the board pusher. Accordingly, a board pusher control means 232 can be considered to include limit switches 224, 228 and solenoids 226, 230.

The nailing control means includes a means for controlling downward movement of nail guns and a means for controlling upward movement of the nail guns. Push button switch 234 provides a means for manually energizing solenoid 236 which actuates mechanism 84 of the nailing means to produce downward movement of the nail guns. Solenoid 236 is also energized if either limit switch 238 and contact 240 are closed, or if contact 242 alone is closed. Limit switch 238 serves as a check to determine that a slat is in position for nailing. Contact 240 is closed by a signal from sensor module 244 which includes the radiant energy responsive element 88 shown in FIG. 3. Contact 242 is closed by a signal produced from a second sensor module 246 which includes a second radiation responsive element not shown in FIG. 3. First and second radiant energy beams and sensor modules are required if it is desired to place two adjacent nails in a single slat.

Normally open limit switch 248 is closed when the mounting linkage for the nail guns has moved to its bottom most position. Closure of switch 248 energizes solenoid 250 and serves to actuate cylinder 84 to move in the reverse direction, thereby raising the nail guns.

Normally open limit switch 252 is closed by movement of the conveyor to a position which indicates that transverse slats must be ejected onto underlying board stringers. Closure of switch 252 energizes solenoid 254 causing mechanism 146 in FIG. 6B to be actuated. This, in turn, results in the ejection from the slat magazine of the lowermost transverse slat. The slat ejecting control means 256 may also be manually operated by push button switch 258. After ejection of the lower most slat from the slat magazine, normally open switch 260 is closed which energizes solenoid 262 and results in actuation of mechanism 144 to retract the cam members. Retraction may also be accomplished manually by push button switch 264.

Control means 266 for actuating the stringer ejecting mechanism to push stringers into the guide channels include normally open limit switch 268 and solenoid 270 which actuate cylinder and ram mechanism 106. Manual actuation of the stringer ejecting means is also provided by push button switch 272. The stringer ejecting means is retracted by closure of limit switch 274, which energizes solenoid 276. Retraction may be manually accomplished by means of push button switch 278.

The electrial controls diagramed in FIG. 8 may suitably be conventional components. For example, the main drive may suitably be a one horsepower DC drive such as the Minipack VS drive available from Reliance Electric Co. The push button controls and limit switches are available from Allen-Bradley. The sensor modules are suitably Opcon Model 8170A devices. The solenoid valves are suitably Alcon Model 7980X318(S30) devices. Also, cylinder and ram mechanism 84 shown in FIG. 3 may suitably be a Fabco Model D321 device.

Referring to FIGS. 9A, 9B and 9C, an alternate embodiment of automatic nailing apparatus is disclosed. The embodiment shown in the various views of FIG. 9 corresponds identically to the embodiment shown in FIGS. 1-8, except whereas the guide channels in apparatus embodiment 10 are fixed, the guide channels in the second embodiment are adjustable.

The automatic nailing apparatus embodiment shown in the views of FIG. 9 is generally designated by the reference numeral 200. It includes a frame 202 having first and second longitudinal frame rail members 204, 206. Carried on frame 202 are a plurality of stringer guide channels 208A, 208B and 208C. Guide channels 208A and 208C are mounted, respectively, to frame rail members 206 and 204. The middle guide channel is mounted to transverse frame members (not shown).

The width spacing between frame rail members 204 and 206 adjustable by front and rear width adjustment mechanisms 210, 217. Adjustment of the width between the frame rail members results in movement of guide channels 208A and 208C. The middle guide channel 208B remains stationery.

A further width adjustment which is made is the movement of slat magazine end stop 214. This lateral or width adjustment is accomplished by width adjustment mechanism 216.

The width adjustment mechanisms may suitably be a screw-type device comprising threaded rods mounted in fixed position for rotation and carrying thereon a nut-like structure affixed to the adjustable guide channels. With such device, upon rotation of the rods, there is translational movement thereon of the nut-like structures, which is effective to laterally displace the guide channels.

Finally, as indicated in FIG. 9C, the distance between slat carrier lugs may also be adjustable to provide for various width transverse slats.

The foregoing description of the invention has been directed to particular preferred embodiments for the purposes of explanation and illustration. It would be apparent, however, to those skilled in the art that many modifications and changes can be made in the embodiments without departing from the teachings and concepts of the invention. It is intended that the following claims cover all equivalent modifications and variations that fall within the scope of the invention.

What is claimed is:

1. An automatic nailing apparatus for nailing transverse board slats to spaced parallel board stringers, comprising:

an elongated frame having parallel, longitudinally-extending guide means for directing stringers along spaced-apart parallel paths;

a transversely-extending member elevated above said frame;

a stringer magazine mounted on said frame adjacent each of said guide means, for holding in a vertical stack a plurality of board stringers;

means for ejecting from each stringer magazine a lowermost one of a vertical stack of stringers therein, to place a stringer in each of said guide means;

a slat magazine mounted on said frame, for holding in a vertical stock a plurality of board slats;

means for ejecting from said slat magazine a lowermost one of a vertical stock therein, to place a transversely-extending slat onto a plurality of stringers located in said guide means;

a conveyor carried in said frame, for continuously advancing as a unit a transversely-extending slat and a plurality of underlying stringers;

nailing means mounted on said transverse member, for automatically nailing a transversely-extending slat to each of said stringers; and nailing control means for sensing that a slat is in position beneath said nailing means, and actuating said nailing means, thereby driving a nail through the slat into each of the underlying stringers as the same are continuously moved by said conveyor.

2. The apparatus of claim 1, further comprising:

first ejector control means for actuating said stringer ejecting means; and second ejector control means for actuating said slat ejecting means.

3. The apparatus of claim 1 wherein said conveyor comprises:

first and second endless conveyor chains spaced apart and extending parallel to one another;

a member extending transverse to said endless chains and connected thereto for movement therewith, said member for engaging the aft end of stringers placed in said guide means and advancing them along toward said nailing means; and a plurality of spaced-apart lugs carried on said endless chains for engaging transversely-extending slats placed onto stringers in said guide means so as to advance the slats with the stringers.

4. The apparatus of claim 1 wherein said nailing control means comprises:

a source of radiant energy positioned proximate said nailing means, for establishing a beam of radiant energy directed across the pathway of an advancing slat so as to be interrupted thereby;

a radiant energy responsive element positioned opposite the radiant energy source and disposed in substantial alignment therewith so as to be impinged by the radiant energy beam; and means coupled to the radiant energy responsive element for causing said nailing means to operate when a slat advances into position interrupting the beam of radiant energy.

5. The apparatus of claim 1 wherein said nailing means comprises:

a plurality of nailing guns, transversely spaced apart from one another, and each gun being disposed over one of said board stringer guide means;

means mounting said nailing guns to said transversely-extending member, for providing vertical movement relative thereto; and means for causing said nailing guns to move vertically between a raised position, and a lowered position in contact with an advancing slat to drive a nail therethrough.

6. The apparatus of claim 1 wherein said conveyor comprises:

first and second endless conveyor chains spaced apart and extending parallel to one another; and a plurality of spaced-apart pusher lugs carried on said endless chains and arranged as a plurality of adjacent pairs with one lug of each pair being on one of said conveyor chains, each of said adjacent pairs of pusher lugs being provided for engaging the back edge of a transversely-extending board slat so as to advance the slat along with the underlying stringers; and a pair of adjacent frontal registration lugs carried on said conveyors a defined distance from the last of said adjacent pair of pusher lugs.

7. The apparatus of claim 6 further comprising:

means mounted to said frame for pushing the lead transverse slat into abuttment with the frontal registration lugs on said conveyor; and means for controlling said slat pushing means, so as to push the lead slat into abuttment with the registration lugs immediately prior to actuation of said nailing means.

8. Automatic nailing apparatus for nailing a plurality of spaced-apart transverse board slats to a plurality of underlying, spaced-apart longitudinal board stringers being continuously moved along as a unit, comprising:

a separate nail gun for driving a nail at each intersection a transverse board slat makes with the plurality of underlying board stringers;

each of said nail guns being automatically actuable upon contact with the surface of a board member to be nailed;

means for mounting said nail guns in a transversely spaced-apart arrangement, and providing for vertical movement of the nail guns;

means connected to said nail guns mounting means and actuated by a control signal, for causing said nail guns to move from a raised position to a lowered position in contact with the surface of an advancing board slat and back to the raised position; and nailing control means for sensing that a transverse slat is in position beneath said nail guns, and producing the control signal to actuate said nail guns movement means.

9. The apparatus of claim 8 wherein said nailing control means comprises:

a source of radiant energy positioned proximate said nail guns, for establishing a beam of radiant energy directed across the pathway of an advancing slat so as to be interrupted thereby;

a radiant energy responsive element positioned opposite the radiant energy source and disposed in substantial alignment therewith so as to be impinged by the radiant energy beam, said element producing a detectable response signal upon interruption of the radiant energy beam; and means coupled to the radiant energy responsive element for detecting the response signal of said radiant energy responsive means, and for producing the control signal to actuate said nail guns movement means.

10. An automatic nailing apparaus for nailing transverse board slats to spaced parallel board stringers, comprising:

an elongated frame having parallel, longitudinally-extending guide means for directing stringers along spaced-apart parallel paths;

a transversely-extending member elevated above said frame;

a stringer magazine mounted on said frame adjacent each of said guide means, for holding in a vertical stack a plurality of board stringers;

means for ejecting from each stringer magazine a lower-most one of a vertical stack of stringers therein, to place a stringer in each of said guide means;

said stringer ejecting means including:

(i) an individual primary pivot arm mechanism for each stringer magazine;

(ii) said primary pivot arm mechanisms being interconnected for simultaneous movement;

(iii) a fluid pressure-operated cylinder and ram mechanism connected to one of said interconnected primary pivot arm mechanisms, for moving the same between first and second pivot positions; and (iv) an individual secondary pivot arm mechanism connected to each of said primary pivot arm mechanisms, (v) each of said secondary pivot arm mechanisms having a member thereon for movement between a retracted first pivot position, and an extended second pivot position for engaging and ejecting the lowermost one of a stack of board stringers in a respective one of the stringer magazines;

a slat magazine mounted on said frame, for holding in a vertical stack a plurality of board slats;

means for ejecting from said slat magazine a lower-most one of a vertical stack therein, to place a transversely-extending slat onto a plurality of stringers located in said guide means;

a conveyor carried in said frame, for continuously advancing as a unit a transversely-extending slat and a plurality of underlying stringers;

nailing means mounted on said transverse member, for automatically nailing a transversely-extending slat to each of said stringers; and nailing control means for sensing that a slat is in position beneath said nailing means, and actuating said nailing means, thereby driving a nail through the slat into each of the underlying stringers as the same are continuously moved by said conveyor.

11. An automatic nailing apparatus for nailing transverse board slats to spaced parallel board stringers, comprising:

an elongated frame having parallel, longitudinally-extending guide means for directing stringers along spaced-apart parallel paths;

a transversely-extending member elevated above said frame;

a stringer magazine mounted on said frame adjacent each of said guide means, for holding in a vertical stack a plurality of board stringers;

means for ejecting from each stringer magazine a lower-most one of a vertical stack of stringers therein, to place a stringer in each of said guide means;

a slat magazine mounted on said frame, for holding in a vertical stack a plurality of board slats;

means for ejecting from said slat magazine a lowermost one of a vertical stack therein, to place a transversely-extending slat onto a plurality of stringers located in said guide means;

said slat ejecting means including:

(i) first and second pivot arm mechanisms, (ii) said pivot arm mechanisms being linked together for simultaneous movement, (iii) each of said pivot arm mechanisms having a member thereon for movement between a retracted first pivot position and an extended second pivot position, for engaging the lowermost one of a stack of board slats in said slat magazine and ejecting the same; and (iv) a fluid pressure-operated cylinder and ram mechanism connected to said pivot arm mechanisms for pivoting the same between first and second pivot positions;

a conveyor carried in said frame, for continuously advancing as a unit a transversely-extending slat and a plurality of underlying stringers;

nailing means mounted on said transverse member, for automatically nailing a transversely-extending slat to each of said stringers; and nailing control means for sensing that a slat is in position beneath said nailing means, and actuating said nailing means, thereby driving a nail through the slat into each of the underlying strings as the same are continuously moved by said conveyor.

* * * * *